United States Patent [19]

Mattson

[11] Patent Number: 4,492,632
[45] Date of Patent: Jan. 8, 1985

[54] ADAPTOR FOR EXTERNAL OIL FILTER

[76] Inventor: Fred P. Mattson, Box 207, Elmwood, Wis. 54740

[21] Appl. No.: 562,156

[22] Filed: Dec. 16, 1983

[51] Int. Cl.³ .................. B01D 27/08; F01M 1/10
[52] U.S. Cl. .................... 210/168; 210/416.5; 210/443; 210/450; 123/196 A
[58] Field of Search ............ 210/168, 416.5, DIG. 17, 210/443, 450; 123/196 A; 184/6.24

[56] References Cited

U.S. PATENT DOCUMENTS

| | | | |
|---|---|---|---|
| 2,691,429 | 10/1954 | Kovacs | 184/6.24 |
| 3,540,594 | 11/1970 | Sanderson | 210/232 |
| 3,743,096 | 7/1973 | Harvey, Jr. et al. | 210/232 |
| 3,982,520 | 9/1976 | Wheeler | 210/444 |
| 4,406,784 | 9/1983 | Obchran | 210/168 |

*Primary Examiner*—Richard V. Fisher
*Assistant Examiner*—Wanda L. Millard
*Attorney, Agent, or Firm*—Orrin M. Haugen; Thomas J. Nikolai; Douglas L. Tschida

[57] ABSTRACT

A seal containing cast adaptor member having inlet and outlet ports for hose coupling to an externally mounted disposable cartridge-type oil filter. The housing thus permits the engine's conversion from a conventional often inaccessibly placed spin-off filter or smaller replaceable cartridge filter to a larger capacity, externally mounted filter.

5 Claims, 5 Drawing Figures

ADAPTOR FOR EXTERNAL OIL FILTER

BACKGROUND OF THE INVENTION

The present invention relates to oil filters for internal combustion engines and, in particular, to an assembly for converting a conventional and oftentimes inaccessibly mounted spin-off type of cartridge type filter to an externally mounted, larger capacity filter.

As working space becomes more and more cramped within the engine compartment of modern day diesel and gas powered vehicles and even though engines are theoretically engineered to operate with smaller volumes of oil, for large heavy duty equipment, it becomes burdensome to have to change oil as frequently as required by the small capacity oil filters that are used therewith. Typically, these filters have a capacity on the order of 150 cubic inches. Also, because of the conditions these engines typically operate under, a small filter does not permit enough cool oil to circulate, thereby causing the engine to run hotter. Further, because the maintenance cycle for such equipment is oftentimes rather protracted, the oil filter is oftentimes filled long before the anticipated maintenance is performed.

It is, accordingly, a primary object of the present invention to provide an assembly for converting an engine having a relatively small oil filter to operate with a larger, more readily accessible and externally mounted oil filter. Specifically, the invention comprises a sealable, cast adaptor housing having an inlet and outlet port that is threadably mountable to the threaded stem of the engine's conventional oil filter receiving casting, either of the spin-off type or replaceable cartridge type, so as to permit the secure mounting of the conversion adaptor casting thereto. The inlet and outlet ports are then coupled to an externally mounted and larger capacity oil filter via a pair of hoses. The larger filter is further compatible with replaceable insert type filters. Thus, the present invention not only facilitates the subsequent changing of oil, but provides for a larger capacity reservoir.

The various objects, advantages and distinctions of the present invention over the use of smaller, conventional filters will, however, become more apparent hereinafter, upon directing attention to the following description of the preferred embodiment with respect to the following drawings. Before referring thereto, though, it is to be recognized that the invention is described with respect to its presently preferred embodiment only and, therefore, various modifications may be made thereto by those of skill in the art without departing from the spirit and scope thereof.

SUMMARY OF THE INVENTION

An assembly for converting an internal combustion engine from an integrally mounted spin-off type or cartridge type oil filter to a larger capacity externally mounted, replaceable cartridge type oil filter. The assembly comprises a hollow cast adaptor housing having a centrally displaced threaded spindle and a radially removed circular sealing member for permitting the sealed mounting of the cast adaptor member to an engine's existing spin-off filter or cartridge filter receiving casting. A pair of inlet and outlet ports and hoses couple oil from the engine to a larger peripherally mounted, replaceable insert type cartridge filter receiving assembly. Specifically, the larger filter provides for 4 to 5 times more capacity than the otherwise stock filter.

DESCRIPTION OF THE PREFERRED EMBODIMENT

Figure 1A:
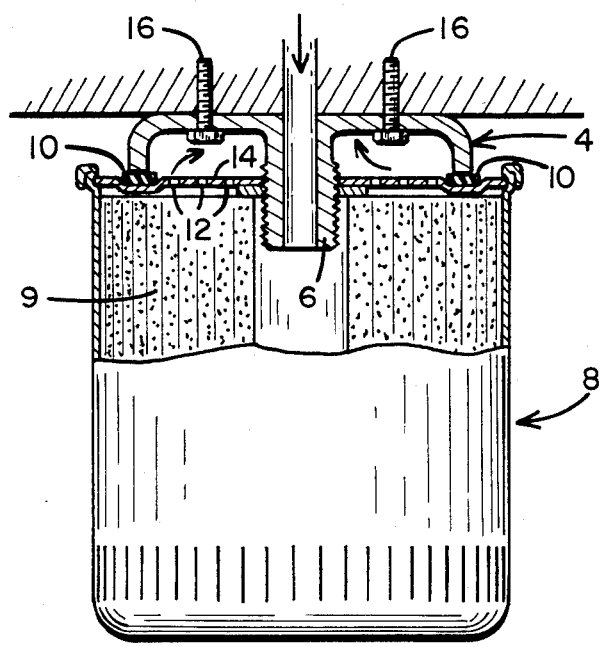
FIGS. 1a and 1b show respective partially sectioned elevation and plan views of a conventional, smaller capacity spin-off filter assembly.
Figure 1B:
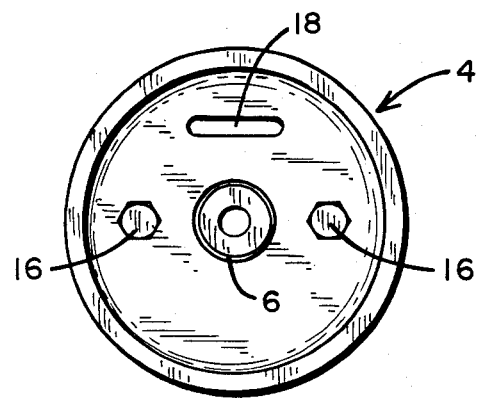

Referring to FIGS. 1a and 1b, respective partially sectioned elevation and plan views are shown of a conventional spin-off type oil filter system for heavy equipment. In particular and referring to FIG. 1a, such a system typically comprises a casting member 4 that is bolted via through bolts 16 to the engine or frame and which has a centrally disposed male threaded hollow spindle 6 for receiving a mating threaded replaceable spin-off oil filter cartridge 8. For typical engines, the replaceable spin-off oil cartridge 8 comprises a filter containing approximately 150 cubic inches of one micron filter paper 9. The filter 8 is mounted to the casting member 4 by screwing it onto the spindle 6, and the filter 8 is sealed to the casting 4 via a circular rubber seal 10 on the filter 8 that mates with the flanged outer annular walls of the casting 4. Thus, as oil is pumped from the engine (not shown) under pressure, it passes through the stem 6 and into the filter 8. The pressure then forces the oil through the layers of the filter paper 9 and back out the top of the oil cartridge 8 through the plurality of relief holes 12 that are let into the metallic cap 14 of the filter 8. A return hole 18 (see FIG. 1b) bored in the casting 4, in turn, permits the oil to return to the engine and, in particular, the oil pan, where it is again pumped through the engine.

Figure 1C:
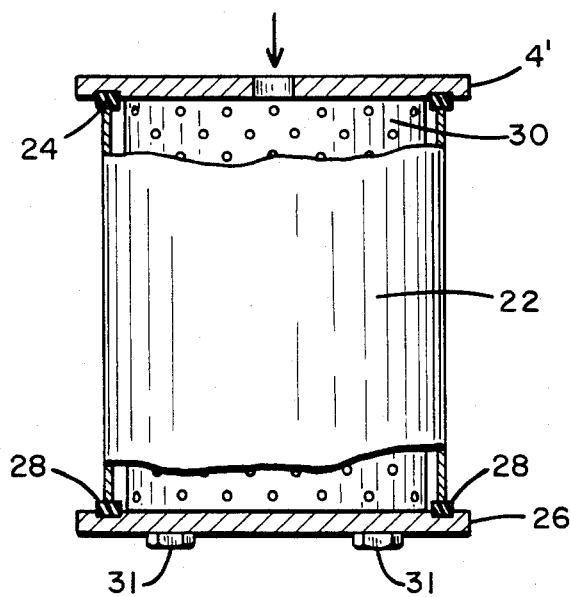
FIG. 1c shows a partially sectioned elevation view of a small capacity replaceable cartridge filter assembly.
Figure 2A:
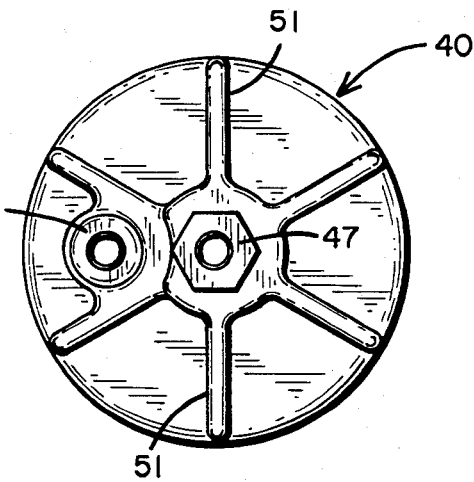
FIG. 2a shows a plan view of the present adaptor casting.
Figure 2:
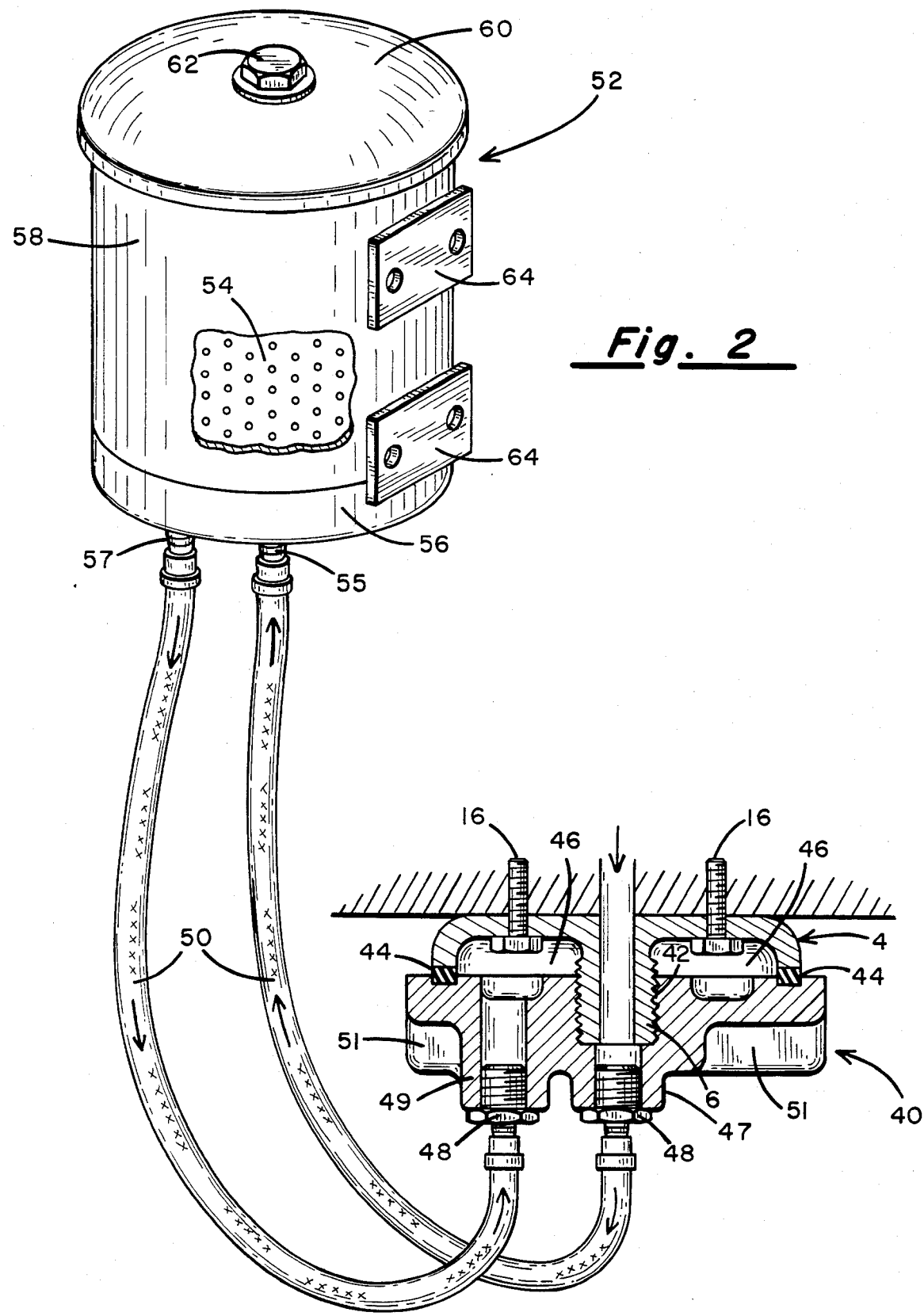
FIG. 2 shows a perspective view of the present invention's adaptor casting as it mounts to the oil filter casting at the engine, as well as the associated coupling hoses and larger capacity filter assembly.

Before turning attention to FIG. 2, it is to be recognized that for some previous types of engines, in lieu of an integrally mounted spin-off oil filter 8, the engine contained a multi-sectioned canister assembly. A typical assembly of this type can be seen in FIG. 1c and wherein an essentially flat casting 4', much like the casting 4, is mounted to the engine or frame for receiving a cylindrical sleeve 22. The sleeve 22 is sealed to the engine via an annular seal 24 and to its bottom cap 26 via a second annular seal 28. A disposable filter cartridge 30 is mounted within the sleeve 22 and contained to the engine 4 via a pair of mounting bolts 31 which extend therethrough to the engine. Thus, oil is filtered in the same way, but the replacing of the filter cartridge 30 is somewhat messy, since the oil contained within the sleeve 22 tends to drip all over the individual performing the maintenance. For this reason, assemblies were previously developed for converting the replaceable cartridge system of FIG. 1c to adapt the casting 41 to accept spin-off filters of the type of FIG. 1a.

The present invention, on the other hand and in distinction to the previous adaptors, contemplates the conversion of a system of either of the types of FIG. 1a or 1c from a relatively small size oil filter to a larger filter that is more compatible with the harsh use encountered by heavy equipment engines. Further and in order to facilitate maintenance, the present invention contemplates an adaptor casting 40 for mounting to the casting 4 of FIGS. 1a, 1b, or 1c and whereby the oil is filtered in a canister type replaceable cartridge assembly 52 at a remote and more accessible location, before being returned to the engine. In that regard, attention is now directed to FIG. 2 and wherein the present oil filter system is more particularly shown.

From FIG. 2, a partially sectioned perspective view is shown of the components of the present oil filtering system. Specifically, FIG. 2 discloses a ribbed casting adaptor member 40 having a female threaded recess 42 for receiving the spindle 6 of FIG. 1a. Opposed to the recess 42 and surrounding the threaded outlet opening is an integrally cast, hexagonal surface 47 and which facilitates the tightening and removal of the adaptor member 40 from the engine with a wrench. Radially disposed from the central recess 42 are at the outermost edge of the casting 40 an annular seal 44 which may be made of Neoprene or other suitable material and spaced inwardly therefrom is an annular recess 46 for receiving oil from the filter and directing it to the return hole 18 of the casting 4 and back to the engine. A pair of threaded nipples 48 are mounted to the inlet and outlet recesses and thus oil is directed from the engine through the spindle 6 and back to the engine via the recess 46.

Coupled to the threaded nipples 48 are a pair of hoses 50 and which couple the oil to and from the externally mounted, cartridge containing filter assembly 52. It should be noted that, depending on the oil pressure the engine is capable of producing, these hoses 50 should be as short as possible. The filter assembly 52 is shown in partial cutaway so as to expose the internally mounted cartridge type filter 54 and which is contained between the base plate 56, sleeve 58 and top sealing dome 60. A top-mounted through bolt 62 sealably secures the top 60 and cartridge 54 within the assembly 52, while the mounting brackets 64 secures the entire filter assembly 52 to the vehicle at a desired location. In use, therefore, the oil is directed from the engine through the spindle 6, adaptor member 40 and associated outlet nipple 48 and hosing 50 to the coupler 55 at the base plate 56, where the oil is centrally directed interiorly of the cylindrical oil filter cartridge 54. The oil thereafter is filtered through the layers of filter paper 54, and which now comprises approximately 750 cubic inches of one micron paper, before the oil is returned via the coupler 57 and hosing 50 to the inlet recess 46 and thence to the engine.

A further plan view of the present cast adaptor member 40 is also shown in FIG. 2a. There the hexagonal surface 47 is shown relative to the standoff 49 associated with the recess 46. Also shown are the strengthening ribs 51 that are part of the cast adaptor 40.

The present invention, therefore, now permits one to convert an existing spinoff or engine-mounted cartridge type oil filter system to a peripherally mounted system, whereby the oil filter is readily accessible for normal maintenance. Further, the present system permits the use of a relatively larger size filter. From the foregoing, it should be recognized too that while the present system was essentially described with respect to heavy equipment vehicles, alternatively the concepts may be applied to automobile and light truck engines and wherein space limitations are making it increasingly more difficult to perform general maintenance, such as changing oil. There, however, the size of the adaptor casting 40 would be reduced as well as the size of the filter assembly 52. Further, it may be desirable to provide more or less structural ribbing 51 about the casting 40 so as to increase its strength or reduce its size or weight.

While the present invention has been described with respect to its presently preferred embodiment, it is to be recognized that various modifications may be made thereto by those of skill in the art upon reference hereto. It is, accordingly, contemplated that the following claims should be interpreted so as to include all those equivalent embodiments within the spirit and scope thereof.

What is claimed is:

1. An oil filter adaptor assembly for an internal combustion engine having an internal oil pump and an external mounting member whereat a first bypass oil filter of a first capacity is normally attached, comprising:

a generally squat, cylindrical cast adaptor member having a threaded central bore formed therein for mounting about an externally threaded tubular spindle extending from said mounting member and through which unfiltered oil is directed from said engine, said adaptor member including an outlet port in fluid flow communication with an annular recess formed in said cast adaptor member and through which filtered oil flows to said engine, and said adaptor member further including a gasket extending from a surface of said adaptor member in surrounding relation to said recess for sealing against said mounting member upon threadably securing said bore to said spindle;

second bypass filter means of a capacity substantially greater than said first oil filter and remotely mounted from said adaptor member and including a replaceable oil filter cartridge for filtering the engine oil; and means for coupling dirty engine oil flowing through said central bore and spindle to said second bypass filter means and filtered oil back to said outlet port and said annular recess and thence to said engine.

2. An assembly as set forth in claim 1 wherein said casting is fabricated from a cast metal and includes a plurality of strengthening ribs positioned therearound.

3. An assembly as set forth in claim 1 wherein said adaptor member includes a multi-faceted external surface portion, whereby torque may be applied to said adaptor member when securing it to said mounting plate.

4. An oil filter adaptor assembly for an internal combustion engine having an internal oil pump and an external mounting member whereat a bypass oil filter is normally attached, comprising:

an adaptor member mountable to said mounting member in fluid flow relation to the oil in said engine in lieu of said bypass oil filter, wherein said adaptor member comprises a generally squat, cylindrical casting having a threaded central bore formed therein for mounting about a threaded spindle on said mounting member and whereat unfiltered engine oil is received from said engine, said casting including an annular recess having an outlet port in fluid flow communication therewith formed in one surface thereof and said adaptor member including a gasket mountable between said mounting member and said recess for forming a hollow cavity therebetween upon securing said central bore to said spindle;

alternate bypass filter means displaced from said mounting member and including a replaceable oil filter cartridge; and means for allowing oil from said inlet port to flow to said alternate bypass filter means and back to said outlet port and annular recess and thence to said engine.

5. An assembly as set forth in claim 4 wherein said casting is fabricated from a cast metal and includes a plurality of strengthening ribs.

* * * * *